US011947839B2

(12) United States Patent
Pitchumani et al.

(10) Patent No.: US 11,947,839 B2
(45) Date of Patent: Apr. 2, 2024

(54) STORAGE DEVICE, SYSTEM, AND METHOD FOR CUSTOMIZABLE METADATA

(71) Applicant: Samsung Electronics Co., Ltd., Suwon-si (KR)

(72) Inventors: Rekha Pitchumani, Oak Hill, VA (US); Yangwook Kang, San Jose, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 17/366,584

(22) Filed: Jul. 2, 2021

(65) Prior Publication Data

US 2022/0357886 A1 Nov. 10, 2022

Related U.S. Application Data (60) Provisional application No. 63/186,586, filed on May 10, 2021.

(51) Int. Cl.
  *G06F 3/06* (2006.01)
  *G06F 1/30* (2006.01)

(52) U.S. Cl.
  CPC .............. *G06F 3/0659* (2013.01); *G06F 1/30* (2013.01); *G06F 3/0619* (2013.01); *G06F 3/0652* (2013.01); *G06F 3/0679* (2013.01)

(58) Field of Classification Search
  CPC ............. G06F 12/0246; G06F 12/0868; G06F 2212/7201; G06F 2212/7203;

(Continued)

(56) References Cited

U.S. PATENT DOCUMENTS 5,754,888 A    5/1998   Yang et al.
6,938,116 B2    8/2005   Kim et al.
(Continued)

FOREIGN PATENT DOCUMENTS

WO    WO 2019/120133 A    6/2019

OTHER PUBLICATIONS

Kin Lane, "Into to APIs: What Is an API?", Apr. 10, 2021, Postman.com, as preserved by the Internet Archive on Apr. 10, 2021, pp. 1-20 http://web.archive.org/web/20210410214431/https://blog.postman.com/intro-to-apis-what-is-an-api/ (Year: 2021).*

(Continued)

*Primary Examiner* — Curtis James Kortman
(74) *Attorney, Agent, or Firm* — Lewis Roca Rothgerber Christie LLP (57) ABSTRACT

A storage device includes: protected memory including one or more log pages; non-volatile memory; and a storage controller. The storage controller includes: a command fetcher to receive a data request command associated with data including first metadata and second metadata, and execute the data request command in the non-volatile memory; a logger to identify the second metadata, and log the second metadata in the one or more log pages; and a log page fetcher/eraser to retrieve the second metadata from the one or more log pages in response to a separate command.

20 Claims, 7 Drawing Sheets

(58) Field of Classification Search
CPC ........... G06F 2212/7207; G06F 3/0679; G06F 3/064; G06F 3/0653; G06F 3/0656; G06F 3/0611; G06F 3/0688; G06F 3/0659; G06F 3/0619; G06F 3/0652; G06F 11/1471; G06F 1/30; G06F 16/14; G06F 16/13; G06F 12/0292; G06F 3/0616; G06F 3/0613; G06F 3/0658; G06F 3/067; G06F 3/0604; G06F 3/062

See application file for complete search history.

(56) References Cited

U.S. PATENT DOCUMENTS

| | | | |
|---|---|---|---|
| 8,402,205 | B2 | 3/2013 | Goss et al. |
| 9,354,985 | B2 | 5/2016 | Jin et al. |
| 9,747,174 | B2 | 8/2017 | Fitzgerald et al. |
| 9,977,612 | B1 | 5/2018 | Lo et al. |
| 10,073,630 | B2 | 9/2018 | Yang et al. |
| 10,540,102 | B2 | 1/2020 | Peterson et al. |
| 10,824,563 | B2 | 11/2020 | Park et al. |
| 10,936,247 | B2 | 3/2021 | Kang |
| 2006/0206538 | A1 | 9/2006 | Veazey |
| 2012/0254120 | A1 | 10/2012 | Fang et al. |
| 2014/0040698 | A1* | 2/2014 | Loh ................... G06F 11/1004 711/E12.001 |
| 2014/0047040 | A1* | 2/2014 | Patiejunas ............. G06F 16/219 709/219 |
| 2015/0370655 | A1 | 12/2015 | Tucek et al. |
| 2016/0071605 | A1* | 3/2016 | Moschiano ......... G11C 11/5642 365/185.12 |
| 2019/0102088 | A1* | 4/2019 | Fang ................... G06F 11/1004 |
| 2019/0138468 | A1* | 5/2019 | Li ........................ G06F 3/0656 |
| 2019/0294363 | A1 | 9/2019 | Caraccio et al. |
| 2020/0057715 | A1 | 2/2020 | Benisty et al. |
| 2020/0242021 | A1 | 7/2020 | Gholamipour et al. |
| 2021/0073139 | A1* | 3/2021 | Sheridan ............. G06F 12/0646 |

OTHER PUBLICATIONS

Schwalb, David, et al., "Hyrise-NV: Instant Recovery for In-Memory Databases using Non-Volatile Memory," International Conference on Database Systems for Advanced Applications, 2016, 15 pages.

Wang, Tianzheng, et al., "Scalable Logging through Emerging Non-Volatile Memory," Proceedings of the VLDB Endowment, vol. 7.10, Jul. 2005, pp. 865-876.

Wei, Qingsong, et al., "Extending SSD Lifetime with Persistent In-memory Metadata Management," 2016 IEEE International Conference on Cluster Computing, 2016, pp. 308-311.

* cited by examiner

STORAGE DEVICE, SYSTEM, AND METHOD FOR CUSTOMIZABLE METADATA

CROSS-REFERENCE TO RELATED APPLICATION(S)

This application claims priority to and the benefit of U.S. Provisional Application No. 63/186,586, filed on May 10, 2021, entitled "CUSTOM SSD," the entire content of which is incorporated by reference herein.

FIELD

Aspects of one or more embodiments of the present disclosure relate to a storage device, a storage system, and method, and more particularly, to a storage device for customizable metadata, a storage system including the same, and a method including the same.

BACKGROUND

Generally, metadata provides important information about one or more aspects of data. In the context of storage and database systems, metadata may refer to information about stored data in one or more storage devices, and may include, for example, information about data elements, index structures, schemas, mappings, and/or the like. Thus, metadata management may be critical to the overall performance of storage and database systems, and thus, most of the overhead of the storage and database systems may be devoted to the handling and processing of the metadata.

The above information disclosed in this Background section is for enhancement of understanding of the background of the present disclosure, and therefore, it may contain information that does not constitute prior art.

SUMMARY

One or more embodiments of the present disclosure are directed to a storage device, a storage system, and method for customizable metadata.

According to one or more embodiments of the present disclosure, a storage device includes: protected memory including one or more log pages; non-volatile memory; and a storage controller including: a command fetcher configured to receive a data request command associated with data including first metadata and second metadata, and execute the data request command in the non-volatile memory; a logger configured to identify the second metadata, and log the second metadata in the one or more log pages; and a log page fetcher/eraser configured to retrieve the second metadata from the one or more log pages in response to a separate command.

In an embodiment, the command fetcher may be configured to store the first metadata along with the data in the non-volatile memory, and the logger may be configured to separately store the second metadata in the one or more log pages.

In an embodiment, the protected memory may be a battery-backed dynamic random-access memory (DRAM).

In an embodiment, the protected memory may be a DRAM connected to a protective capacitor.

In an embodiment, the storage device may further include a log flusher configured to: transfer the one or more log pages from the protected memory to the non-volatile memory; and transfer a log page from the non-volatile memory to the protected memory.

In an embodiment, the log flusher may be configured to transfer the one or more log pages from the protected memory to the non-volatile memory in response to the protected memory exceeding a memory threshold or on power-down.

In an embodiment, the logger may be configured to expose an application programming interface (API) to manage the one or more log pages.

In an embodiment, the API may include at least one of a list logger command to provide a list of available loggers to a requestor, a write logger command to add a new logger in the protected memory, and a select logger command to select a logger.

In an embodiment, the separate command may include at least one of a fetch command to return a log page from among the one or more log pages, an erase command to erase a log page from among the one or more log pages, and an iterate command to return a range of log pages from among the one or more log pages.

According to one or more embodiments of the present disclosure, a storage system includes: one or more processing circuits; and a storage device communicably connected to the one or more processing circuits, and including: protected memory including one or more log pages; non-volatile memory; and a storage controller configured to: receive a data request command to execute in the non-volatile memory; identify metadata included with the data request command; log the metadata in the one or more log pages; receive a separate command from a requestor from among the one or more processing circuits; and retrieve the metadata from the one or more log pages in response to the separate command.

In an embodiment, the storage controller may be further configured to: transfer the one or more log pages from the protected memory to the non-volatile memory; and transfer a log page from the non-volatile memory to the protected memory.

In an embodiment, the storage controller may be configured to transfer the one or more log pages from the protected memory to the non-volatile memory in response to the protected memory exceeding a memory threshold or on power-down.

In an embodiment, the storage controller may include an application programming interface (API) to enable the one or more processing circuits to manage the one or more log pages.

In an embodiment, the API may include at least one of a list logger command to provide a list of available loggers to the requestor, a write logger command to add a new logger in the protected memory, and a select logger command to select a logger.

In an embodiment, the separate command may include at least one of a fetch command to return a log page from among the one or more log pages to the requestor, an erase command to erase a log page from among the one or more log pages, and an iterate command to return a range of log pages from among the one or more log pages.

According to one or more embodiments of the present disclosure, a method of managing metadata, includes: receiving a data request command to execute in non-volatile memory; determining metadata included with the data request command; logging the metadata in one or more log pages in protected memory; receiving a separate command; and retrieving the metadata from the one or more log pages in response to the separate command.

In an embodiment, the method may further include: transferring the one or more log pages from the protected memory to the non-volatile memory; and transferring a log page from the non-volatile memory to the protected memory.

In an embodiment, the transferring of the one or more log pages from the protected memory to the non-volatile memory may include: determining that the protected memory exceeds a memory threshold; and transferring the one or more log pages from the protected memory to the non-volatile memory in response to the memory threshold being exceeded.

In an embodiment, the transferring of the one or more log pages from the protected memory to the non-volatile memory may include: determining that the protected memory has lost or reduced power; and transferring the one or more log pages from the protected memory to the non-volatile memory in response to the lost power or reduced power.

In an embodiment, the separate command may include at least one of a fetch command to return a log page from among the one or more log pages, an erase command to erase a log page from among the one or more log pages, and an iterate command to return a range of log pages from among the one or more log pages.

BRIEF DESCRIPTION OF THE DRAWINGS

The above and other aspects and features of the present disclosure will be more clearly understood from the following detailed description of the illustrative, non-limiting example embodiments with reference to the accompanying drawings.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, description thereof may not be repeated.

Generally, storage system overheads may mainly come from metadata handling. Such metadata overheads may include, for example, inefficient input/output (IO) patterns (e.g., small, synchronous IOs), update overheads (e.g., indexing), write-amplification (e.g., for consistency), and computations (e.g., sorting, hashing, and the like). For example, creating or processing metadata may include complex processing operations (e.g., string sorting and hashing) or an ordered processing, which may incur a large delay between IOs, lowering the throughput of the storage system. Further, for consistency purposes, in-memory metadata may be synchronized with corresponding on-disk structures (e.g., main index structures), resulting in increased write-amplification and multiple small synchronous IOs, which may delay other data request operations until the multiple small synchronous IOs are completed.

To reduce such high metadata overheads, some performance-oriented storage systems may be configured to delay the metadata processing by storing the raw data for the metadata safely to a disk first with no or relatively few computations, and then processing the raw data later in the background to generate the metadata. As an example, Log-structured merge trees (e.g., RocksDB) may store key-value pairs to a temporary file, may later read the keys from the file, generate indices of the keys, and then update a main index structure. Even in this case, however, small synchronous IOs may be used in order to provide strong consistency, and background processing overheads (e.g., such as compaction overheads) may still dominate resources, which may affect the overall throughput of the storage system.

According to one or more embodiments of the present disclosure, a storage device, a storage system, and a method for customizable metadata may be provided, in which customizable metadata (or customizable metadata information) may be logged in a durable space, and may be retrieved by various suitable collaborating storage services or applications on demand (e.g., in response to a user-command, a user configuration, periodically, or as desired) for later processing. For example, a user may send any desired information for the customizable metadata to be logged in pre-defined and/or user-defined log pages by piggybacking on any suitable data request command, and the log pages may be subsequently fetchable and erasable by any suitable collaborating storage service or application as needed or desired.

In some embodiments, the durable space may include, for example, protected memory (e.g., a battery-backed DRAM) of the storage device, and the log pages may be selectively transferred to non-volatile memory (e.g., NAND flash memory) of the storage device, for example, in response to a threat of being lost (e.g., limited space, power down, switching power sources, and/or the like). Thus, if the protected memory has a large enough capacity, and the logged metadata is fetched and erased quickly enough by the collaborating storage services or applications, the log pages may not need to be stored in the non-volatile memory, which may reduce synchronous IOs caused by frequent transfers of the metadata and may increase the life expectancy of the non-volatile memory. Accordingly, consistency may be relatively ensured, while increasing throughput of the storage device and the overall storage system.

In some embodiments, the customizable metadata may be user defined and the log pages may be user defined, such that the user may be enabled to log any desired information in the log pages, and may transmit the customizable metadata (or the customizable metadata information) for logging in the log pages by piggybacking with any suitable data request command. For example, the data associated with the data request command may include user data (e.g., the data to be read/written/erased/and the like), and metadata information associated with the data request command, for example, such as cyclic redundancy check (CRC) data sent by the user along with the user data. The customizable metadata (or the customizable metadata information) to be logged in the log pages may be further included with the data associated with the data request command, and may be logged in the log pages while the data request command is being executed. The customizable metadata (or customizable metadata information) may include any suitable user desired metadata that is fetchable, erasable, and the like on demand (e.g., in response to a user-command or a user configuration, periodically, or as desired). Thus, one example difference between the metadata (e.g., the CRC data) associated with the data and the customizable metadata may be that the metadata associated with the data may be stored and erased along with the data, and thus, may not be separately retrievable based on a separate command (e.g., a separate user command, a separate signal, or configuration). Further, one difference between the customizable metadata and internal metadata is that the internal metadata may not be sent by the user along with the user data and may be used internally by the components of the storage device, and thus, may not be retrievable based on the separate command. Accordingly, unlike the metadata (e.g., the CRC data) that is associated with the data of the data access command and generally stored along with the data or the internal metadata that is used internally by the components of the storage device, the customizable metadata may include any desired information to be logged in one or more log pages, and may be separately stored from the data and metadata corresponding to the data request command.

In some embodiments, the storage device may expose a set of Application Programming Interfaces (APIs) to allow any collaborating storage service or application to generate user-defined log functions for logging the customizable metadata in the log pages, and may allow access to the log pages on-demand for processing (e.g., post-processing) the customizable metadata as needed or desired. For example, any suitable processing circuit located within the storage system may generate a logger for the log pages, and may fetch and/or erase one or more of the log pages on-demand. In some embodiments, if the storage device is configured with suitable compute capabilities, the storage device may further compute (e.g., sort, hash, translate, convert, and/or the like) the customizable metadata prior to logging in the log pages and/or prior to providing the log pages to a requestor (e.g., a requesting processing circuit). Accordingly, the overhead associated with processing the customizable metadata may be offloaded from a host device to another processing circuit located within or communicably connected to the storage system and/or to the storage device itself, depending on a configuration of the storage device and system.

Accordingly, the storage device, storage system, and method according to one or more embodiments of the present disclosure may be applied to any suitable collaborating storage service or application in which the storage device logs customizable, user-defined metadata that is retrievable on-demand by the collaborating storage services or applications for later processing. Some non-limiting examples of such collaborating storage services or applications include, for example, index metadata logging and collaborative indexing, lost write tracking, software-defined fairness and scheduling, access tracking for analytics, data rebalancing, caching, and/or the like.

Figure 1:
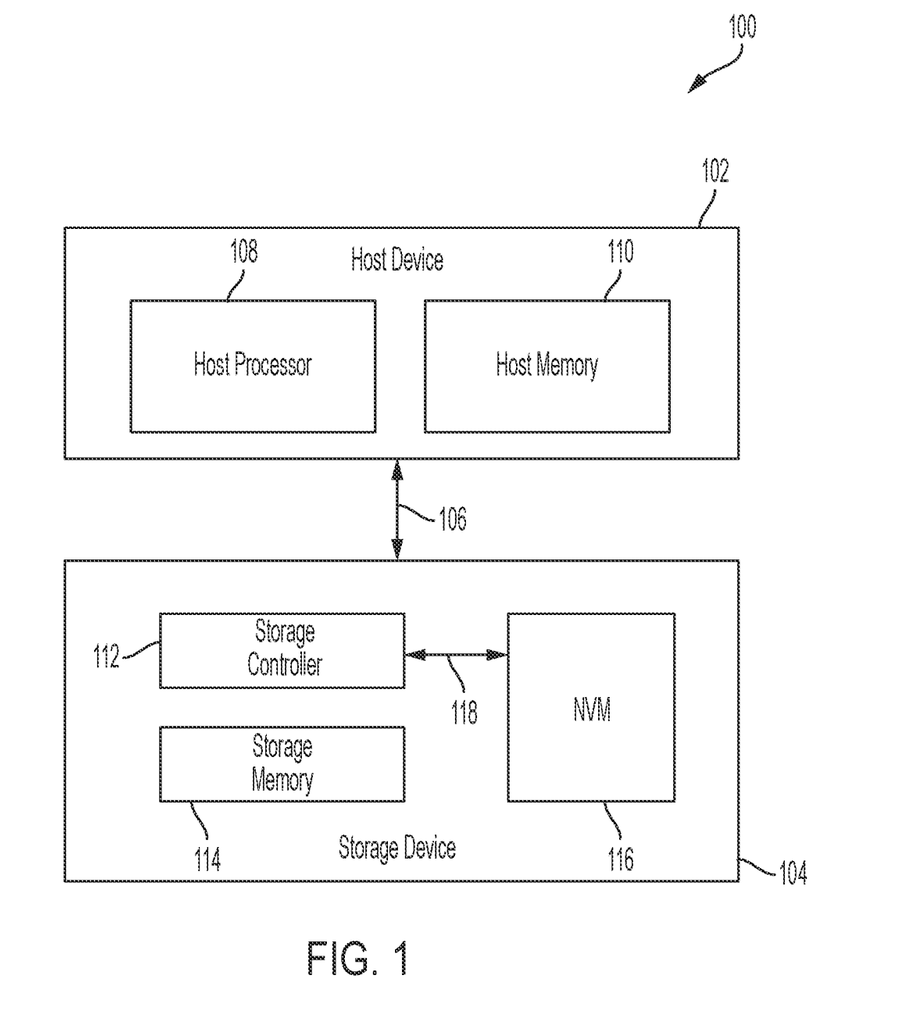
FIG. 1 illustrates a schematic block diagram of a storage system according to one or more embodiments of the present disclosure.

FIG. 1 illustrates a schematic block diagram of a storage system according to one or more embodiments of the present disclosure.

FIG. 1 shows a simplified example of a storage system 100 in which one host device 102 is connected to one storage device 104, but the present disclosure is not limited thereto, and the storage system 100 may include any suitable number of host devices that are each connected to any suitable number of storage devices. Further, the storage system 100 may include a plurality of storage devices that may be connected to the same host device (e.g., the host device 102) or different host devices. Accordingly, in various embodiments, there may be a central node (e.g., a central processing circuit) that may centrally manage the metadata stored in the plurality of storage devices, or the storage system 100 may be a distributed storage system in which multiple nodes (e.g., multiple processing circuits) may manage the metadata stored in the same or different ones of the plurality of storage devices.

Referring to FIG. 1, the host device 102 may be connected to the storage device 104 over a host interface 106. The host device 102 may issue data request commands (e.g., WRITE/ERASE commands) to the storage device 104 over the host interface 106, and may receive responses from the storage device 104 over the host interface 206. For example, the responses may include requested data stored in the storage device 104, and/or a notification from the storage device 104 that a corresponding data request command has been successfully executed by the storage device 104.

The host device 102 may include a host processor 108 and host memory 110. The host processor 108 may be a processing circuit, for example, such as a general purpose processor or a central processing unit (CPU) core of the host device 102. The host processor 108 may be connected to other components via an address bus, a control bus, a data bus, and/or the like. The host memory 110 may be considered as high performing main memory (e.g., primary memory) of the host device 102. For example, in some embodiments, the host memory 110 may include (or may be) volatile memory, for example, such as dynamic random-access memory (DRAM). However, the present disclosure is not limited thereto, and the host memory 210 may include (or may be) any suitable high performing main memory (e.g., primary memory) replacement for the host device 102 as would be known to those skilled in the art. For example, in other embodiments, the host memory 110 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

The storage device 104 may be considered as secondary memory that may persistently store data accessible by the host device 102. In this context, the storage device 104 may include (or may be) relatively slower memory when compared to the high performing memory of the host memory 110. For example, in some embodiments, the storage device 104 may be secondary memory of the host device 102, for example, such as a Solid-State Drive (SSD). However, the present disclosure is not limited thereto, and in other embodiments, the storage device 104 may include (or may be) any suitable storage device, for example, such as a magnetic storage device (e.g., a hard disk drive (HDD), and the like), an optical storage device (e.g., a Blue-ray disc drive, a compact disc (CD) drive, a digital versatile disc (DVD) drive, and the like), other kinds of flash memory devices (e.g., a USB flash drive, and the like), and/or the like. In various embodiments, the storage device 104 may conform to a large form factor standard (e.g., a 3.5 inch hard drive form-factor), a small form factor standard (e.g., a 2.5 inch hard drive form-factor), an M.2 form factor, an E1.S form factor, and/or the like. In other embodiments, the storage device 104 may conform to any suitable or desired derivative of these form factors. For convenience, the storage device 104 may be described hereinafter in the context of an SSD, but the present disclosure is not limited thereto.

The storage device 104 may be communicably connected to the host device 102 over the host interface 106. The host interface 106 may facilitate communications (e.g., using a connector and a protocol) between the host device 102 and the storage device 104. In some embodiments, the host interface 106 may facilitate the exchange of storage requests and responses between the host device 102 and the storage device 104. In some embodiments, the host interface 106 may facilitate data transfers by the storage device 104 to and from the host memory 110 of the host device 102. For example, in various embodiments, the host interface 106 (e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the host interface 106 (e.g., the connector and the protocol thereof) may include (or may conform to) various general-purpose interfaces, for example, such as Ethernet, Universal Serial Bus (USB), and/or the like.

In some embodiments, the storage device 104 may include a storage controller 112, storage memory 114, non-volatile memory (NVM) 116, and a storage interface 118. The storage memory 114 may be high-performing memory of the storage device 104, and may include (or may be) volatile memory, for example, such as DRAM, but the present disclosure is not limited thereto, and the storage memory 114 may be any suitable kind of high-performing volatile or non-volatile memory. In some embodiments, the storage memory 114 may be protected memory, for example, such that in the event of power loss or power down the log pages stored in the protected memory may be prevented or substantially prevented from being lost. For example, in some embodiments, the storage memory 114 may include (or may be) a battery-backed DRAM, but the present disclosure is not limited thereto. As another example, the storage memory 114 may be connected to a suitably sized capacitor (e.g., a protective capacitor) to store (e.g., to temporarily store) the log pages in the event of power loss. Hereinafter, the storage memory 114 may also be referred to as protected memory 114. The NVM 116 may persistently store data received, for example, from the host device 102. The NVM 116 may include, for example, NAND flash memory, but the present disclosure is not limited thereto, and the NVM 116 may include any suitable kind of memory for persistently storing the data according to an implementation of the storage device 104 (e.g., magnetic disks, tape, optical disks, and/or the like).

The storage controller 112 may be connected to the NVM 116 over the storage interface 118. In the context of the SSD, the storage interface 118 may be referred to as a flash translation layer (FTL), and may be an interface with which the NVM 116 (e.g., NAND flash memory) may communicate with a processing component (e.g., the storage controller 112) or other device. Commands such as reset, write enable, control signals, clock signals, and/or the like may be transmitted over the storage interface 118. Further, a software interface may be used in combination with a hardware element that may be used to test/verify the workings of the storage interface 118. The software may be used to read and write data to the NVM 116 via the storage interface 118. Further, the software may include firmware that may be downloaded onto the hardware elements (e.g., for controlling write, erase, and read operations).

The storage controller 112 may be connected to the host interface 106, and may manage signaling over the host interface 106. In some embodiments, the storage controller 112 may include an associated software layer to manage the physical connector of the host interface 106. The storage controller 112 may respond to IO requests received from the host device 102 over the host interface 106. The storage controller 112 may also manage the storage interface 118 to control, and to provide access to and from, the NVM 116. For example, the storage controller 112 may include at least one processing component embedded thereon for interfacing with the host device 102 and the NVM 116. The processing component may include, for example, a digital circuit (e.g., a microcontroller, a microprocessor, a digital signal processor, or a logic device (e.g., a field programmable gate array (FPGA), an application-specific integrated circuit (ASIC), and/or the like)) capable of executing data access instructions (e.g., via firmware and/or software) to provide access to and from the data stored in the NVM 116 according to the data access instructions. For example, the data access instructions may correspond to the data request commands, and may include any suitable data storage and retrieval algorithm (e.g., READ/WRITE/ERASE) instructions, and/or the like.

According to one or more embodiments of the present disclosure, the storage controller 112 may receive data request commands (e.g., write/erase commands) over the host interface 106, as well as customizable metadata included in (e.g., piggybacking) the commands. The storage controller 112 may store the customizable metadata in the log pages of the storage memory (e.g., the protected memory) 114 while executing (e.g., concurrently or simultaneously) the data request commands. In response to a separate command (e.g., a separate user command, a separate signal, or configuration), the storage controller 112 may retrieve the log pages from the storage memory (e.g., the protected memory) 114, and may provide the log pages to a requestor (e.g., a processing circuit).

Figure 2:
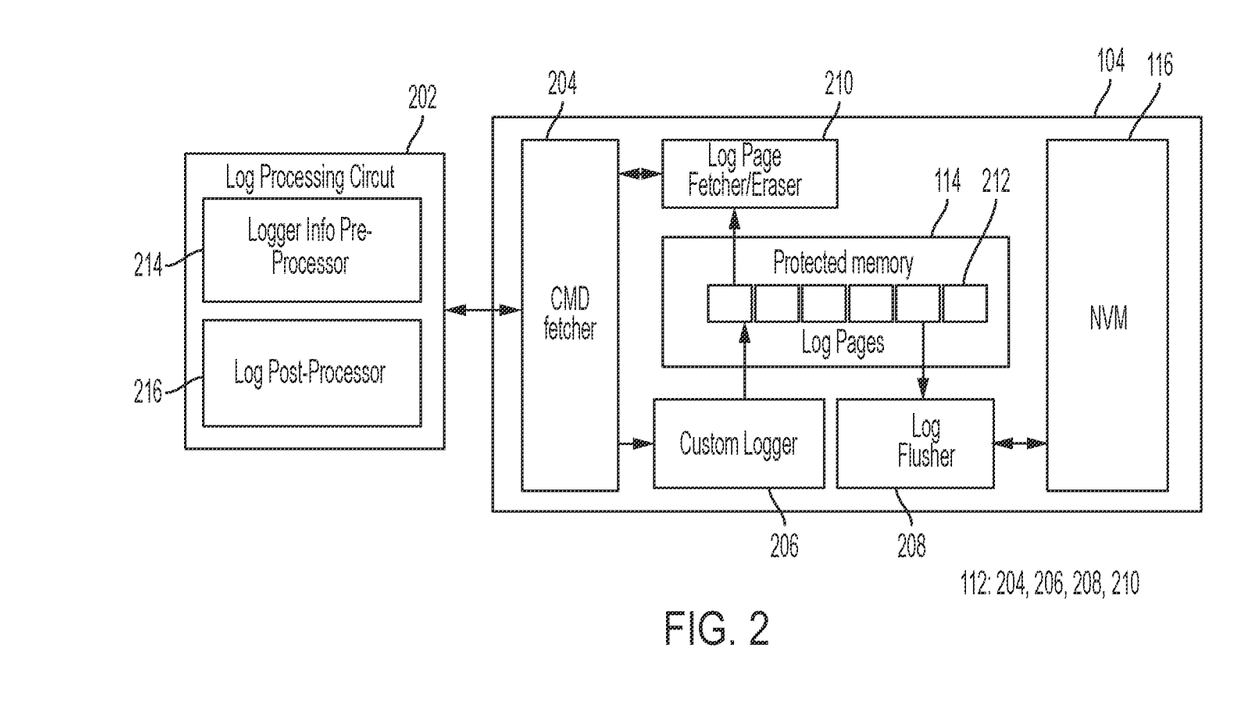
FIG. 2 illustrates a schematic block diagram of a processing circuit and a storage device included in a storage system according to one or more embodiments of the present disclosure.

FIG. 2 illustrates a schematic block diagram of a processing circuit 202 and the storage device 104 included in the storage system 100 according to one or more embodiments of the present disclosure.

Referring to FIG. 2, the storage controller 112 of the storage device 104 may include a command (CMD) fetcher 204, a custom logger 206, a log flusher 208, and a log page fetcher/eraser 210. In brief overview, the CMD fetcher 204 may receive data request commands from the host device 102 over the host interface 106 (e.g., see FIG. 1), and may transmit responses (e.g., notifications) to the host device 102 in response to executing the data request commands. The custom logger 206 may manage predefined and/or user-defined logging functions to log the customizable metadata in an incoming data request command to appropriate log pages 212 in the protected memory 114. The log flusher 208 may flush the log pages 212 from the protected memory 114 to the NVM 116, and may load log pages from the NVM 116 to the protected memory 114, as needed or desired. The log page fetcher/eraser 210 may read and erase the log pages 212 from the protected memory 114 on demand (e.g., in response to a separate command, such as a user-command, a user configuration, periodically, or as desired). While FIG. 2 shows an example directional flow of some communications between the components of the storage device 104, the present disclosure is not limited to the communication directions indicated by the arrows in FIG. 2, and the communications between the various components may be uni-directional or bi-directional.

In more detail, the custom logger 206 may include a pre-defined logger and/or one or more user-defined loggers, which may be created by utilizing a set of APIs exposed by the custom logger 206 to allow any suitable collaborating storage service or application (e.g., a log processing circuit 202) to create user-defined logging functions for logging the customizable metadata into suitable ones of the log pages 212. Some examples of the APIs exposed by the custom logger 206 may include, for example, ListLoggers, which provides a list of the available loggers, WriteLogger, which adds a new logger, for example, by taking a cross-complied binary or eBPF (if supported), and SelectLogger, which selects an available logger, but the present disclosure is not limited to these examples.

As an example, for each data request operation (e.g., write or erase), the pre-defined logger may record a pair of an operation type (e.g., write or erase), and a key (or other relevant or desired metadata) in a suitable one of the log pages 212, for example, when the key includes metadata, but the present disclosure is not limited thereto. The user-defined logging functions may correspond to any suitable user provided function that may be used as a logger. The user provided function may be provided using any suitable programming language (e.g., eBPF, C/C++, and/or the like), which may depend on the architecture of the storage device 104. For convenience, a non-limiting example of a user-defined logging function that may be used to create a user-defined logger is shown in EXAMPLE 1 below.

Example 1 int logger (void *dest, void *key, int keylength, void *value, int valuelength):
    Add Timestamp at dest addr and increment dest by the number of bytes written;
    Add keylength at dest addr and increment dest by the number of bytes written;
    Copy keylength bytes from key to dest addr and increment dest by the number of bytes written;
    If valuelength<preconfigured valueloglength:
        Add valuelength at dest addr and increment dest by the number of bytes written;
        Copy valuelength bytes from value to dest addr and increment dest by the number of bytes written;
    Else:
        Add valueloglength at dest addr and increment dest by the number of bytes written;
        Copy valueloglength bytes from value to dest addr and increment dest by the number of bytes written;
    Return total bytes written In Example 1, the input may be a key-value pair, the destination (dest) may be a byte array (output), and the return value may be the bytes written.

The log flusher 208 may implement on-demand paging for the log pages 212 in the protected memory 114. For example, the log flusher 208 may evict the log pages 212 from the protected memory 212 to the NVM 116 in response to the log pages 212 being under threat of being lost (e.g., upon a threshold limit of the protected memory 114 being reached, on power down, and/or when a power source is switched), and thus, write-amplifications caused by frequent transfers of the metadata from the protected memory 114 to the NVM 116 may be reduced and small synchronous IOs may be reduced. Moreover, by reducing write-amplifications to the NVM 116 and the small synchronous IOs, the life expectancy of the NVM 116 may be improved. Further, the log flusher 208 may load a log page 212 from the NVM 116 into the protected memory 212 as needed or desired (e.g., when requested by the log page fetcher/eraser 210 and/or the custom logger 206).

The log page fetcher/eraser 210 may allow any suitable collaborating storage service or application (e.g., the log processing circuit 202) to read and erase the log pages 212 for processing (e.g., post-processing) the log pages 212. For example, in response to various commands, (e.g., user commands, user log page commands, signals from other devices, and/or the like) the log page fetcher/eraser 210 may fetch and return a log page 212 to a requestor (e.g., the log processing circuit 202), erase a log page 212 on demand by the requestor, and iterate through the log pages to return log pages in a particular range to the requestor, but the present disclosure is not limited to these examples.

Accordingly, any suitable processing circuit 202, for example, such as the host processor 108, a local/remote storage server processor, a processing circuit (e.g., a programming switch) connected to a fabric or the host interface 106, and/or the like located within or communicably connected to the storage system 100, may include (e.g., may be) a log processing circuit 202 including a logger info pre-processor 214 that may pre-process the metadata to be logged and/or communicate with the custom logger 206 (e.g., via the APIs) to generate one or more user-defined loggers, and/or a log post-processor 216 that may communicate with the log page fetcher/eraser 210 to retrieve and process one or more log pages 212 in the protected memory 114 and post-process the logged metadata.

For example, the host device 102 may piggyback the customizable metadata into the data request command, and a downstream logger info pre-processor 214, for example, such as a processing circuit connected to the fabric or the host interface 106, may receive (or intercept) the data request command, extract the customizable metadata from the data request command, modify (e.g., reformat, convert, add, reduce, and/or the like) the customizable metadata for storing in a log page 212, and transmit the data request command to the storage device 104 for storing in the log page 212. As another example, the host device 102 may issue the data request command without the customizable metadata, and the downstream logger info pre-processor 214 may receive the data request command, piggyback the customizable metadata into the data request command, and transmit the data request command to the storage device 104 for storing in the log page 212. As another example, the host device may include a logger info pre-processor to modify (e.g., reformat, convert, add, reduce, and/or the like) the customizable metadata before piggybacking the customizable metadata into the data request command. Accordingly, in various embodiments, the logger info pre-processor may piggyback the customizable metadata into a data request command, may intercept and modify the customizable metadata that is piggybacking a data request command, may intercept a data request command issued by a host device without the customizable metadata and may piggyback the customizable metadata into the data request command, and/or the like.

Further, in some embodiments, the storage controller 112 may be optionally implemented with sufficient compute capabilities, such that the storage controller 112 may pre-process (e.g., sort, hash, translate, convert, and/or the like) the customizable metadata information prior to logging in the log pages 212, may add or change the customizable metadata information prior to logging in the log pages 212, and/or may post-process (e.g., compute, modify, and/or the like) the metadata information in the log pages 212 prior to returning the log pages 212 to the requestor. Accordingly, overheads associated with processing the log pages 212 may be offloaded to any suitable processing circuit 202 in communications with the storage device 104, and/or to the storage device 104 itself, according to an implementation (e.g., an architecture) of the storage system 100 and storage device 104 (e.g., eBPF/FPGA/GPU/E-SSD/Fabric-Attached Compute (e.g., programmable switches), and/or the like).

While FIG. 2 shows that the logger info pre-processor 214 and the log post-processor 216 are part of the same log processing circuit 202, the present disclosure is not limited thereto. For example, in various embodiments, each of the processors 214 and 216 may be a general purpose or specific purpose processor, an application specific integrated circuit (ASIC), one or more field programmable gate arrays (FPGAs), a group of processing components, or other suitable processing components that are communicably connected to the storage device 104. Each of the processors 214 and 216 may be integrated within a single device (e.g., a single log processing circuit 202) or distributed across multiple separate systems or devices. Further, each of the processors 214 and 216 may be an internal processor with respect to the storage system 100 or may be an external processor implemented as part of a cloud-based computing system.

Figure 3:
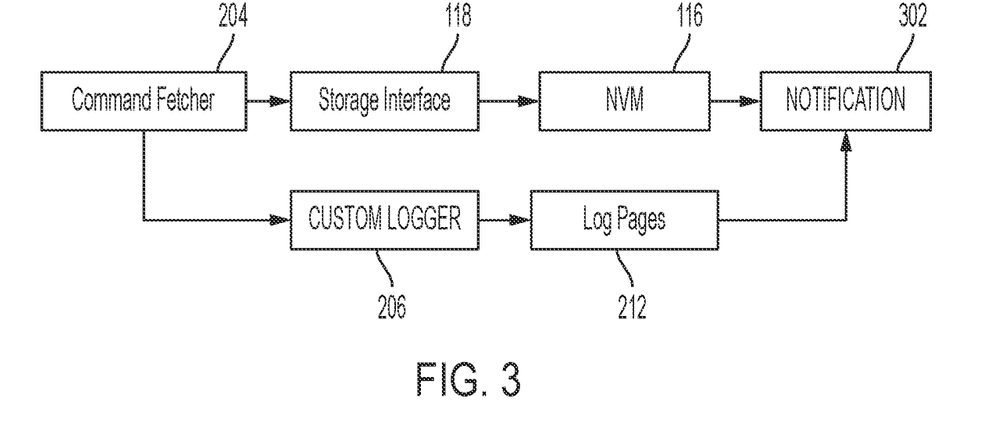
FIG. 3 illustrates a schematic flow of a method of executing a data request command according to one or more embodiments of the present disclosure.

FIG. 3 illustrates a schematic flow of a method of executing a data request command according to one or more embodiments of the present disclosure. FIGS. 4A-4D are schematic block diagrams showing various examples of data and metadata associated with a data request command according to one or more embodiments of the present disclosure.

Referring to FIGS. 2 and 3, in some embodiments, the command fetcher 204 may receive a data request command (e.g., from the host device 102), and may execute the data request command. For example, in some embodiments, when the data request command is a write command, the command fetcher 204 may execute the write command such that data associated with the write command and the metadata (e.g., the CRC data) associated with the data (e.g., also referred to hereinafter as $1^{st}$ metadata) is stored in the NVM 116 over the storage interface 118. As another example, in some embodiments, when the data request command is an erase command (or a delete command), the command fetcher 204 may execute the erase command by first reading the data associated with the erase command and any $1^{st}$ metadata associated with the data from the NVM 116 through the storage interface 118, and then erasing the data and the $1^{st}$ metadata. In some embodiments, the command fetcher 204 may transmit a notification 302 to the requestor of the data request command (e.g., the host device 102), for example, indicating that the data request command was successfully executed.

In some embodiments, the customizable metadata (e.g., also referred to as hereinafter as $2^{nd}$ metadata) may be included in (e.g., piggybacked on) the data request command. For example, the data associated with the data request command may further include the customizable metadata (e.g., the $2^{nd}$ metadata). In this case, while executing the data request command, the command fetcher 204 may transmit (e.g., concurrently or simultaneously) the command (or the data or the customizable metadata associated with the command) to the custom logger 206, and the custom logger 206 may store the customizable metadata (e.g., the $2^{nd}$ metadata) in one or more appropriate log pages 212 in the protected memory 114. For example, in various embodiments, the command fetcher 204 may parse the customizable metadata from the data associated with the data request command to transmit the customizable metadata to the custom logger 206 for logging in the log pages 212, or may transmit the data request command as a whole or partially to the custom logger 206 to parse the customizable metadata therefrom. However, the present disclosure is not limited thereto, and in some embodiments, the data request command may include a write command with a predetermined Data field including the $2^{nd}$ metadata, a write command with an empty data field for the data to be written to the NVM 116, a write command with a flag indicating that the $2^{nd}$ metadata is included, a special command indicating that the $2^{nd}$ metadata is included, and/or the like, which allows only the customizable metadata to be written to appropriate ones of the log pages in the protected memory 212, without writing any data to the NVM 116. In this case, the command fetcher 204 may transmit the command or the $2^{nd}$ metadata parsed therefrom to the custom logger 206 for logging, but may not store any data or metadata in the NVM 116.

Figure 4A:
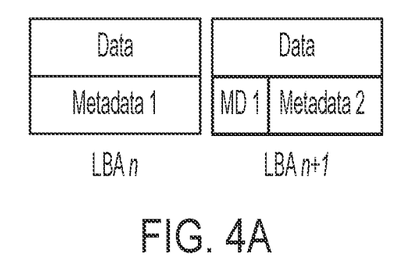
FIG. 4A is a schematic block diagram showing an example of data and metadata included with a data request command according to one or more embodiments of the present disclosure.
Figure 4B:
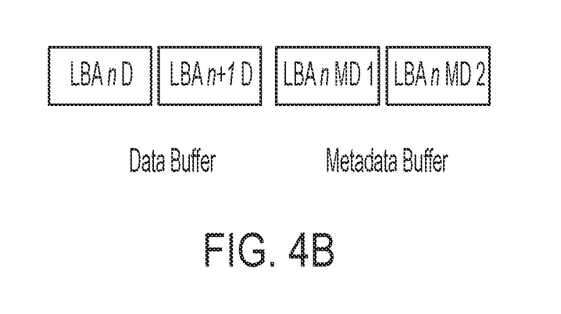
FIG. 4B is a schematic block diagram showing an example of data and metadata included with a data request command according to one or more embodiments of the present disclosure.
Figure 4C:
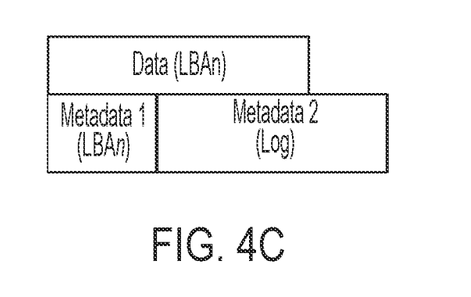
FIG. 4C is a schematic block diagram showing an example of data and metadata included with a data request command according to one or more embodiments of the present disclosure.

Referring to FIGS. 4A through 4D, the metadata (e.g., the 1st and 2nd metadata) may be included in (e.g., piggybacked on) the data request command in various suitable ways. For example, the metadata may be included in the data associated with the data request command itself (e.g., as shown in FIGS. 4A and 4C), or the storage device 104 may include separate spaces for the data and the metadata, for example, such as a separate data buffer and metadata buffer (e.g., as shown in FIG. 4B). In either case, the metadata space of the data or the metadata buffer may include at least one of the $1^{st}$ metadata (e.g., the metadata such as CRC data associated with the data of the data request command) Metadata 1 (or MD1) and/or the $2^{nd}$ metadata (e.g., the customizable metadata) Metadata 2 (or MD2) for separate storing in one or more log pages 212.

For example, in some embodiments, a size of the metadata space may be defined (e.g., predefined) according to an implementation of the storage device 112, such that a part of the metadata space may be allocated for the $1^{st}$ metadata Metadata 1 and another part of the metadata space may be allocated for the $2^{nd}$ metadata Metadata 2. In this case, when the custom logger 206 receives the data request command (or the customizable metadata or the information corresponding to the customizable metadata), for example, from the command fetcher 204, it may store all the metadata in the metadata space allocated for the $2^{nd}$ metadata Metadata 2 into appropriate ones of the log pages 212. In another example, in some embodiments, the storage device 104 may include sufficient compute capabilities, for example, such that the custom logger 206 may identify and extract (e.g., based on a token, a unique identifier, and/or the like) the $2^{nd}$ metadata Metadata 2 from the metadata space associated with the data request command, which may allow more flexibility in the amount of the customizable metadata (or metadata information) that may be piggybacked on any given data request command.

Accordingly, in various embodiments, while the $1^{st}$ metadata Metadata 1 may be metadata (e.g., the CRC data) that is typically associated with the data of the data access command and stored therewith, for example, according to the logical block addressing (LBA) of the data, the $2^{nd}$ metadata Metadata 2 may or may not be associated with the LBA of the data, and instead, may be stored separately in the appropriate log pages in the protected memory irrespective of the LBA of the data. Accordingly, separate IOs to the NVM 116 to log the $2^{nd}$ metadata Metadata 2 may be prevented or reduced, and throughput of the storage system 100 may be improved. While the CRC data is provided as an example of the $1^{st}$ metadata Metadata 1, the present disclosure is not limited thereto, and the $1^{st}$ metadata Metadata 1 may include any suitable metadata associated with the data of the data request command, for example, such as an error correction code, an error correction parity bit, and/or the like.

Figure 4D:
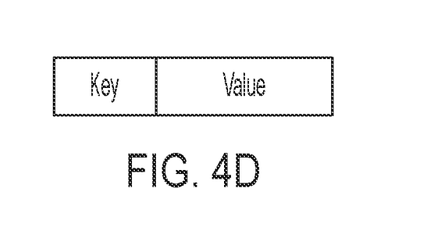
FIG. 4D is a schematic block diagram showing an example of data and metadata included with a data request command according to one or more embodiments of the present disclosure.

While FIGS. 4A through 4C show various examples of piggybacking metadata on the data in various block type storage devices, the present disclosure is not limited thereto, and embodiments of the present disclosure may be applied to any suitable type of storage device, for example, such as object storage devices, zoned namespace (ZNS) storage devices, key-value storage devices, and/or the like. For example, as shown in FIG. 4D, in a key-value storage device (e.g., a KVSSD), the metadata may be defined as the key, the value, or as part of the key-value. In this case, the $2^{nd}$ metadata may include the entire key, in which the key and value may be written together, or may include just the key or part of the key, in which the key may be retrieved from an appropriate log page using a separate command (e.g., a separate user command, signal, or configuration) as needed or desired.

Figure 5:
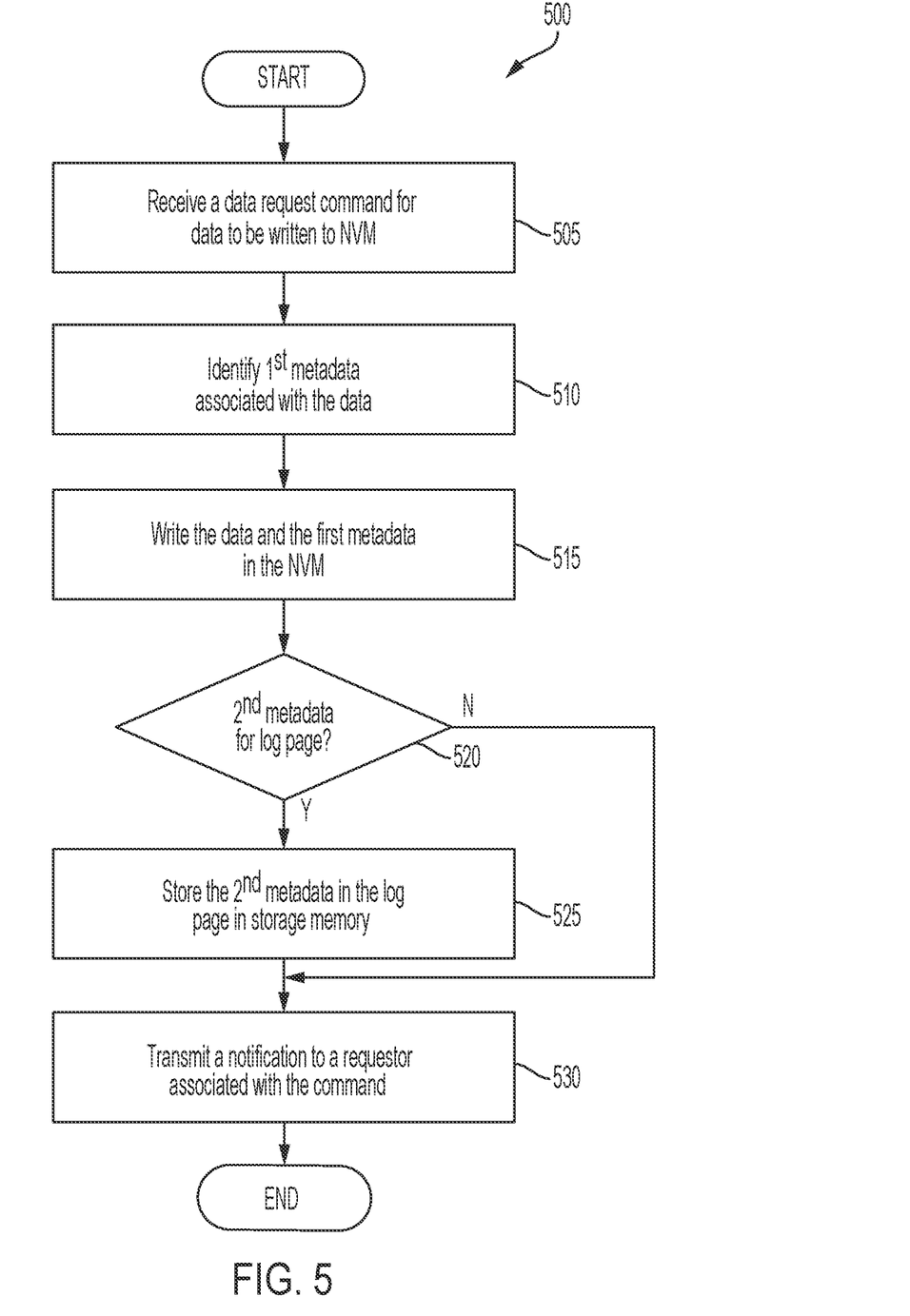
FIG. 5 illustrates a flow diagram of a method of executing a write data request command according to one or more embodiments of the present disclosure.

FIG. 5 illustrates a flow diagram of a method of executing a write data request command according to one or more embodiments of the present disclosure. For example, the method 500 may be performed by the storage controller 112 shown in FIGS. 1 and 2. However, the present disclosure is not limited thereto, and the operations shown in the method 500 may be performed by any suitable one of the components and elements or any suitable combination of the components and elements of those of one or more example embodiments described above. Further, the present disclosure is not limited to the sequence or number of operations of the method 500 shown in FIG. 5, and can be altered into any desired sequence or number of operations as recognized by a person having ordinary skill in the art. For example, in some embodiments, the order may vary, or the method 500 may include fewer or additional operations.

Referring to FIG. 5, the method 500 may start, and the storage device 104 may receive a data request command for data to be written to the NVM 116 at block 505. For example the data request command may be a write command for the data, and the command fetcher 204 may receive the data request command from the host device 102 over the host interface 106 (e.g., see FIGS. 1 and 2).

The storage device 104 may identify $1^{st}$ metadata (e.g., the CRC data or other metadata) associated with the data at block 510, and may write the data and the $1^{st}$ metadata in the NVM 116 at block 515. For example, the data request command may include the data to be written to the NVM 116, and the $1^{st}$ metadata (or $1^{st}$ metadata information) associated with the data of the data request command, which may include metadata associated with the LBA of the data of the data request command to be stored with the data, but the present disclosure is not limited thereto.

The storage device 104 may determine whether the data request command contains $2^{nd}$ metadata for logging in a log page 212 at block 520. For example, the $2^{nd}$ metadata may include the customizable metadata, which may or may not be associated with the data (e.g., the LBA of the data) of the data request command, and is stored separately from the data. If the data request command does not include the $2^{nd}$ metadata (e.g., NO at block 520), then the storage device 104 (e.g., the command fetcher 204) may transmit a notification to a requestor (e.g., the host device 102) indicating that the data request command was successfully executed at block 530, and the method 500 may end.

On the other hand, in response to the storage device 104 (e.g., the command fetcher 204 and/or the custom logger 206) determining that the data request command contains the $2^{nd}$ metadata for logging in a log page 212 at block 520 (e.g, YES at block 520), the storage device 104 (e.g., the custom logger 206) may store (e.g., may log) the $2^{nd}$ metadata in appropriate log pages 212 of the protected memory 112 at block 525. For example, the storage device 104 (e.g., the command fetcher 204 and/or the custom logger 206) may determine that any metadata in an allocated portion (e.g., a predefined portion) in the metadata space associated with the data request command is the $2^{nd}$ metadata to be stored in one or more appropriate log pages 212, or may have sufficient compute capabilities that are configured to identify and extract (e.g., via a token, a unique identifier, and/or the like) the $2^{nd}$ metadata from the metadata space.

Once the $2^{nd}$ metadata is successfully stored (e.g., logged) in the log page 212 at block 525, the storage device 104 (e.g., the command fetcher 204) may transmit a notification to a requestor (e.g., the host device 102) associated with the data request command, indicating that the $2^{nd}$ metadata was successfully logged at block 530, and the method 500 may end. In some embodiments, because blocks 510 and 515 may be performed concurrently (e.g., simultaneously) with blocks 520 and 525 (e.g., see FIG. 3), the command fetcher 204 may transmit a notification when the data request command is successfully executed, and may transmit a separate notification when the $2^{nd}$ metadata is successfully logged, such that one operation may not pose a bottleneck to the other, but the present disclosure is not limited thereto, and in other embodiments, the command fetcher 204 may wait for both operations to successfully complete, and then may transmit a single notification indicating that both operations have been successfully completed.

While FIG. 5 shows an example of the $2^{nd}$ metadata being included in (e.g., piggyback with) a data request command associated with some data to be written in the NVM 116, the present disclosure is not limited thereto. For example, in some embodiments, the data request command may be a write command or other special command with a special Data field such that only the $2^{nd}$ metadata may be logged in an appropriate log page 212, without writing any data to the NVM 116.

Figure 6:
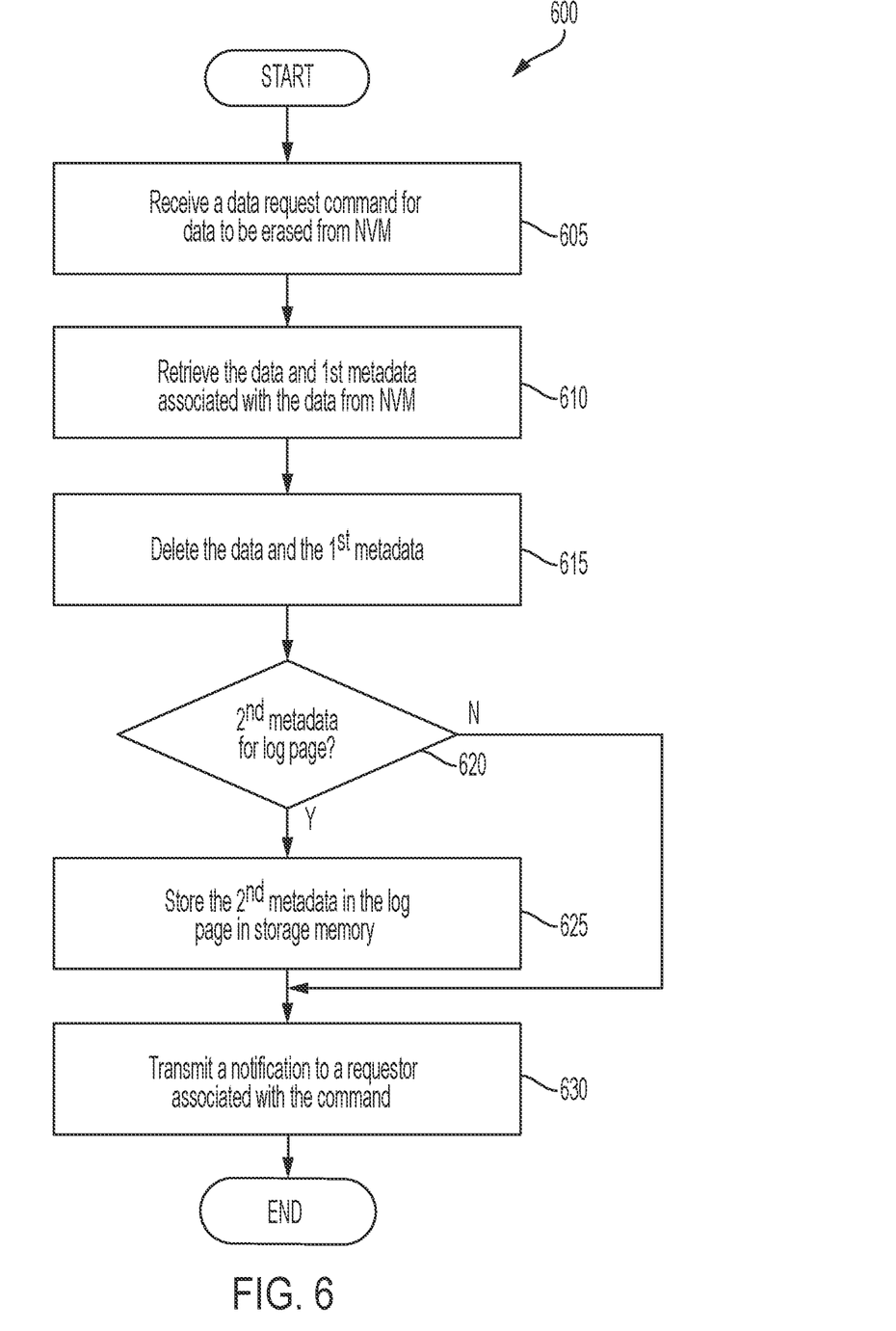
FIG. 6 illustrates a flow diagram of a method of executing an erase data request command according to one or more embodiments of the present disclosure.

FIG. 6 illustrates a flow diagram of a method of executing an erase data request command according to one or more embodiments of the present disclosure. For example, the method 600 may be performed by the storage controller 112 shown in FIGS. 1 and 2. However, the present disclosure is not limited thereto, and the operations shown in the method 600 may be performed by any suitable one of the components and elements or any suitable combination of the components and elements of those of one or more example embodiments described above. Further, the present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method 600 may include fewer or additional operations.

Referring to FIG. 6, the method 600 may start, and the storage device 104 may receive a data request command for data to be erased (e.g., deleted) from the NVM 116 at block 605. For example the data request command may be an erase command to delete the data stored in the NVM 116, and the command fetcher 204 may receive the data request command from the host device 102 over the host interface 106 (e.g., see FIGS. 1 and 2).

The storage device 104 may retrieve the data and $1^{st}$ metadata (e.g., the CRC data or other metadata) associated with the data from the NVM 116 at block 610, and may delete the data and the $1^{st}$ metadata at block 615. For example, the storage device 104 (e.g., the command fetcher 204) may read the data and $1^{st}$ metadata associated with the data request command from the NVM 116, and may perform an erase operation (e.g., a delete operation) on the data and the $1^{st}$ metadata in the NVM 116. The $1^{st}$ metadata (or $1^{st}$ metadata information) associated with the data of the data request command may be associated with the LBA of the data of the data request command, but the present disclosure is not limited thereto.

The storage device 104 may determine whether the data request command contains $2^{nd}$ metadata for logging in a log page 212 at block 620. For example, the $2^{nd}$ metadata may include the customizable metadata, which may or may not be associated with the data (e.g., the LBA of the data) associated with the data request command. If the data request command does not include the $2^{nd}$ metadata (e.g., NO at block 620), then the storage device 104 (e.g., the command fetcher 204) may transmit a notification to a requestor (e.g., the host device 102) indicating that the data request command was successfully executed at block 630, and the method 600 may end.

On the other hand, in response to the storage device 104 (e.g., the command fetcher 204 and/or the custom logger 206) determining that the data request command contains the $2^{nd}$ metadata for logging in a log page 212 at block 620 (e.g, YES at block 620), the storage device 104 (e.g., the custom logger 206) may store (e.g., may log) the $2^{nd}$ metadata in appropriate log pages 212 of the protected memory 112 at block 625. For example, the storage device 104 (e.g., the command fetcher 204 and/or the custom logger 206) may determine that any metadata in an allocated portion (e.g., a predefined portion) in the metadata space associated with the data request command is the $2^{nd}$ metadata to be stored in one or more appropriate log pages 212, or may have sufficient compute capabilities that are configured to identify and extract (e.g., via a token, a unique identifier, and/or the like) the $2^{nd}$ metadata from the metadata space.

Once the $2^{nd}$ metadata is successfully stored (e.g., logged) in the log page 212 at block 625, the storage device 104 (e.g., the command fetcher 204) may transmit a notification to a requestor (e.g., the host device 102) associated with the data request command, indicating that the $2^{nd}$ metadata was successfully logged at block 630, and the method 600 may end. In some embodiments, because blocks 610 and 615 may be performed concurrently (e.g., simultaneously) with blocks 620 and 625 (e.g., see FIG. 3), the command fetcher 204 may transmit a notification when the data request command is successfully executed, and may transmit a separate notification when the $2^{nd}$ metadata is successfully logged, such that one operation may not pose a bottleneck to the other, but the present disclosure is not limited thereto, and in other embodiments, the command fetcher 204 may wait for both operations to successfully complete, and then may transmit a single notification indicating that both operations have been successfully completed.

Figure 7:
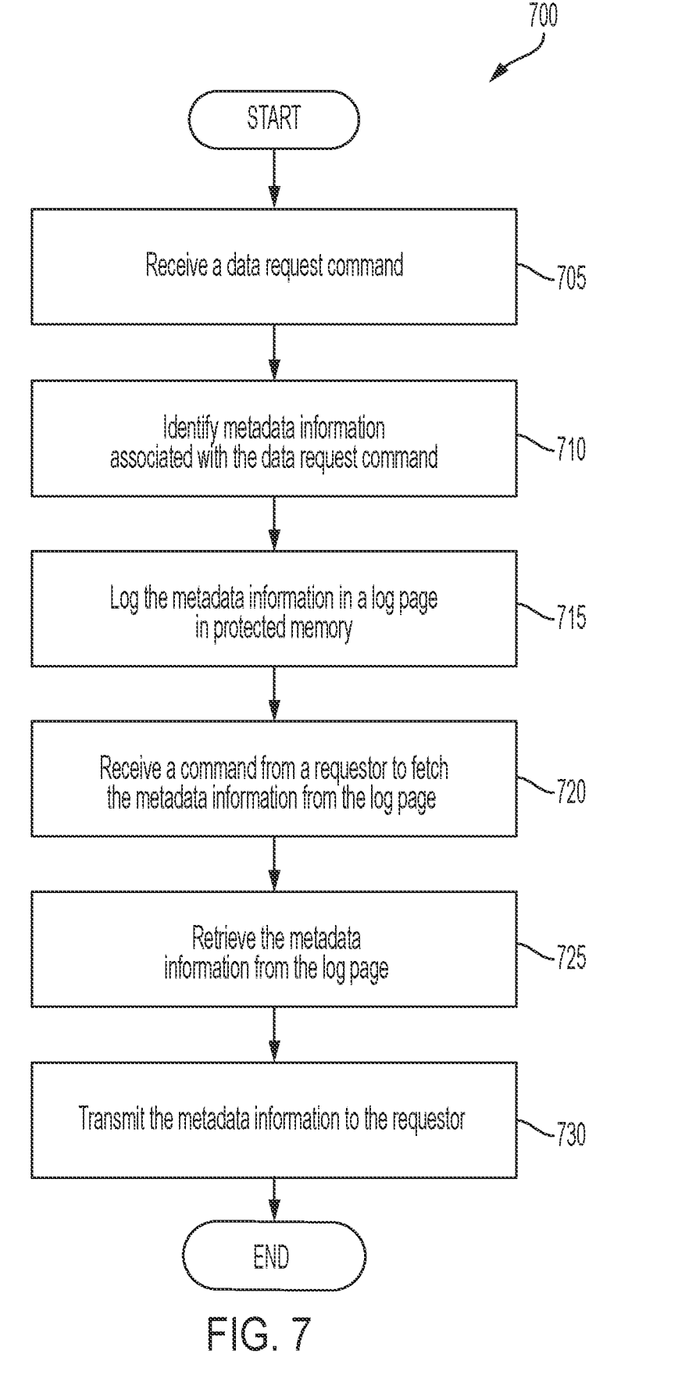
FIG. 7 illustrates a flow diagram of a method of managing customizable metadata according to one or more embodiments of the present disclosure.

FIG. 7 illustrates a flow diagram of a method of managing customizable metadata according to one or more embodiments of the present disclosure. For example, the method 700 may be performed by the storage controller 112 shown in FIGS. 1 and 2. However, the present disclosure is not limited thereto, and the operations shown in the method 700 may be performed by any suitable one of the components and elements or any suitable combination of the components and elements of those of one or more example embodiments described above. Further, the present disclosure is not limited to the sequence or number of the operations of the method 700 shown in FIG. 7, and can be altered into any desired sequence or number of operations as recognized by a person having ordinary skill in the art. For example, in some embodiments, the order may vary, or the method 700 may include fewer or additional operations.

Referring to FIG. 7, the method 700 may start, and the storage device 104 may receive a data request command, for example, from the host device 102 (e.g., see FIG. 1), at block 705. The data request command may be a write command as discussed above with reference to FIG. 5, or an erase command as discussed above with reference to FIG. 6, and thus, the storage device 104 may execute the data request command according to the method 500 or the method 600 described above with reference to FIGS. 5 and 6. For example, the storage device 104 (e.g., the command fetcher 204 or the custom logger 206) may identify metadata information (e.g., the $2^{nd}$ metadata) included with the data request command at block 710 (e.g., corresponding to block 520 or 620 of FIG. 5 or 6), and may log (e.g., may store) the metadata information (e.g., the $2^{nd}$ metadata) in a log page in protected memory 114 at block 715 (e.g., corresponding to block 525 or 625 of FIG. 5 or 6).

In some embodiments, if the data request command is a READ command, only the data associated with the READ command and the $1^{st}$ metadata associated with the data may be read and returned to the requestor of the READ command. However, the present disclosure is not limited thereto, and in other embodiments, the $2^{nd}$ metadata to be stored in one or more suitable log pages 212 may be piggybacked with the READ data request command, similar to that of an erase data request command described above.

Subsequently, the storage device 104 (e.g., the command fetcher 204 or the log page fetcher/eraser 210) may receive a separate command (e.g., a user command, a signal, or the like) from a requestor (e.g., the log processing circuit 202) to retrieve (e.g., may read) the metadata information (e.g., the $2^{nd}$ metadata) from the log page at block 720. For example, the separate command (e.g., the user command or signal) may be a fetch command or an erase command to fetch or erase a log page stored in the protected memory 114. The storage device 104 (e.g., the log page fetcher/eraser 210) may retrieve (e.g., may read) the log page from the protected memory 114 at block 725, may transmit (or may delete) the metadata information (e.g., the $2^{nd}$ metadata) to the requestor (e.g., the log processing circuit 202) at block 730, and the method 700 may end.

According to one or more embodiments of the present disclosure described above, a storage device, system, and method in which customizable metadata may be included in (e.g., piggybacked on) any suitable data request command to be stored in one or more appropriate log pages in protected memory may be provided. According to one or more embodiments of the present disclosure, the logged customizable metadata may be subsequently retrievable from the protected memory for further processing, and the processing of the metadata may be offloaded from the host device to any processing circuit located in or communicably connected to the storage device, or to the storage device itself (e.g., when configured with sufficient compute capabilities). Accordingly, throughput of the storage system may be improved.

While various methods according to one or more embodiments of the present disclosure has been described according to various processes having a certain process order, the present disclosure is not limited thereto. For example, when a certain embodiment may be implemented differently, a specific process order may be different from the described order. For example, two consecutively described processes may be performed at the same or substantially at the same time, may be performed in an order opposite to the described order, or may be performed in an order that does not follow the sequential progression presented in the present disclosure.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some example embodiments have been described, those skilled in the art will readily appreciate that various modifications are possible in the example embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as defined in the appended claims, and their equivalents.

What is claimed is:

1. A storage device comprising:
   protected memory comprising one or more log pages;
   non-volatile memory; and
   a storage controller configured to:
      receive a data request command over a host interface, the data request command including data associated with the data request command, first metadata, and second metadata, and access the non-volatile memory according to the data request command;
      identify the second metadata from the data request command;
      based on a configuration received over a first interface different from the host interface, log the second metadata in the one or more log pages;
      receive a separate command over the first interface; and
      retrieve the second metadata from the one or more log pages in response to the separate command,
   wherein the first metadata is associated with the data, and processed according to the data request command, and
   wherein the second metadata is user-defined metadata included with the data request command, is separately stored from the data and the first metadata, and is processed according to the separate command.

2. The storage device of claim 1, wherein the storage controller is configured to store the first metadata along with the data in the non-volatile memory, and separately store the second metadata in the one or more log pages.

3. The storage device of claim 1, wherein the protected memory is a battery-backed dynamic random-access memory (DRAM).

4. The storage device of claim 1, wherein the protected memory is a DRAM connected to a protective capacitor.

5. The storage device of claim 1, wherein the storage controller is further configured to:
   transfer the one or more log pages from the protected memory to the non-volatile memory; and
   transfer a log page from the non-volatile memory to the protected memory.

6. The storage device of claim 5, wherein the storage controller is configured to transfer the one or more log pages from the protected memory to the non-volatile memory in response to the protected memory exceeding a memory threshold or on power-down.

7. The storage device of claim 1, wherein the storage controller is configured to expose the first interface different from the host interface as an application programming interface (API) to manage the one or more log pages.

8. The storage device of claim 7, wherein the API comprises at least one of a list logger command to provide a list of available loggers to a requestor, a write logger command to add a new logger in the protected memory, and a select logger command to select a logger.

9. The storage device of claim 1, wherein the separate command comprises at least one of a fetch command to return a log page from among the one or more log pages, an erase command to erase a log page from among the one or more log pages, and an iterate command to return a range of log pages from among the one or more log pages.

10. A storage system comprising:
    one or more processing circuits; and
    a storage device communicably connected to the one or more processing circuits, and comprising:
       protected memory comprising one or more log pages;
       non-volatile memory; and
       a storage controller configured to:
          receive a data request command over a host interface to access the non-volatile memory, the data request command including data associated with the data request command, first metadata, and second metadata;
          identify the second metadata included with the data request command;
          based on a configuration received over a first interface different from the host interface, log the second metadata in the one or more log pages;
          receive a separate command over the first interface from a requestor from among the one or more processing circuits; and
          retrieve the second metadata from the one or more log pages in response to the separate command,
    wherein the first metadata is associated with the data, and processed according to the data request command, and
    wherein the second metadata is user-defined metadata included with the data request command, is separately stored from the data and the first metadata, and is processed according to the separate command.

11. The storage system of claim 10, wherein the storage controller is further configured to:
    transfer the one or more log pages from the protected memory to the non-volatile memory; and
    transfer a log page from the non-volatile memory to the protected memory.

12. The storage system of claim 11, wherein the storage controller is configured to transfer the one or more log pages from the protected memory to the non-volatile memory in response to the protected memory exceeding a memory threshold or on power-down.

13. The storage system of claim 10, wherein the first interface different from the host interface comprises an application programming interface (API) to enable the one or more processing circuits to manage the one or more log pages.

14. The storage system of claim 13, wherein the API comprises at least one of a list logger command to provide a list of available loggers to the requestor, a write logger command to add a new logger in the protected memory, and a select logger command to select a logger.

15. The storage system of claim 10, wherein the separate command comprises at least one of a fetch command to return a log page from among the one or more log pages to the requestor, an erase command to erase a log page from among the one or more log pages, and an iterate command to return a range of log pages from among the one or more log pages.

16. A method of managing metadata, comprising:
receiving, by a processing circuit, a data request command over a host interface to access non-volatile memory, the data request command including data associated with the data request command, first metadata, and second metadata;
determining, by the processing circuit, the second metadata included with the data request command;
based on a configuration received over a first interface different from the host interface, logging, by the processing circuit, the second metadata in one or more log pages in protected memory;
receiving, by the processing circuit, a separate command over the first interface; and
retrieving, by the processing circuit, the second metadata from the one or more log pages in response to the separate command,
wherein the first metadata is associated with the data, and processed according to the data request command, and
wherein the second metadata is user-defined metadata included with the data request command, is separately stored from the data and the first metadata, and is processed according to the separate command.

17. The method of claim 16, further comprising:
transferring, by the processing circuit, the one or more log pages from the protected memory to the non-volatile memory; and
transferring, by the processing circuit, a log page from the non-volatile memory to the protected memory.

18. The method of claim 17, wherein the transferring of the one or more log pages from the protected memory to the non-volatile memory comprises:
determining, by the processing circuit, that the protected memory exceeds a memory threshold; and
transferring, by the processing circuit, the one or more log pages from the protected memory to the non-volatile memory in response to the memory threshold being exceeded.

19. The method of claim 17, wherein the transferring of the one or more log pages from the protected memory to the non-volatile memory comprises:
determining, by the processing circuit, that the protected memory has lost or reduced power; and
transferring, by the processing circuit, the one or more log pages from the protected memory to the non-volatile memory in response to the lost power or reduced power.

20. The method of claim 16, wherein the separate command comprises at least one of a fetch command to return a log page from among the one or more log pages, an erase command to erase a log page from among the one or more log pages, and an iterate command to return a range of log pages from among the one or more log pages.

* * * * *